United States Patent
Jung et al.

(10) Patent No.: US 9,503,947 B2
(45) Date of Patent: *Nov. 22, 2016

(54) PRIORITY HANDLING-BASED CELL RESELECTION METHOD IN WIRELESS COMMUNICATION SYSTEM AND APPARATUS FOR SUPPORTING THE METHOD

(71) Applicant: LG ELECTRONICS INC., Seoul (KR)

(72) Inventors: Sunghoon Jung, Seoul (KR); Youngdae Lee, Seoul (KR);
(Continued)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/425,575

(22) PCT Filed: Sep. 9, 2013

(86) PCT No.: PCT/KR2013/008130
§ 371 (c)(1),
(2) Date: Mar. 3, 2015

(87) PCT Pub. No.: WO2014/038910
PCT Pub. Date: Mar. 13, 2014

(65) Prior Publication Data
US 2015/0223126 A1    Aug. 6, 2015

Related U.S. Application Data

(60) Provisional application No. 61/697,815, filed on Sep. 7, 2012, provisional application No. 61/706,737, filed on Sep. 27, 2012.

(51) Int. Cl.
*H04W 4/00* (2009.01)
*H04W 36/04* (2009.01)
*H04W 48/20* (2009.01)

(52) U.S. Cl.
CPC ............. *H04W 36/04* (2013.01); *H04W 48/20* (2013.01)

(58) Field of Classification Search
CPC ................. H04W 36/22; H04W 48/06; H04W 48/18; H04W 36/0083; H04W 72/10;
(Continued)

(56) References Cited

U.S. PATENT DOCUMENTS

2010/0093350 A1    4/2010 Wang et al.
2010/0216469 A1*   8/2010 Yi .......................... H04W 48/20
                                                                  455/435.3
(Continued)

FOREIGN PATENT DOCUMENTS

KR    10-2010-0046187    5/2010
KR    10-2010-0137499    12/2010

OTHER PUBLICATIONS
3GPP TS 36.304 V11.1.0 (Sep. 2012).*
(Continued)

*Primary Examiner* — Nimesh Patel
(74) *Attorney, Agent, or Firm* — Lee Hong Degerman Kang & Waimey

(57) ABSTRACT

Provided is a cell reselection method performed by a terminal in a wireless communication system. The method comprises acquiring information indicating that the lowest priority is to be applied to a specific frequency, applying the lowest priority to the specific frequency and operating a cell reselection, applying the highest priority to the specific frequency upon sensing a specific type cell during the operation, and performing a cell reselection based on the applied lowest priority or highest priority.

8 Claims, 15 Drawing Sheets

(72) Inventors: Sungjun Park, Seoul (KR); Seungjune Yi, Seoul (KR); Jaewook Lee, Seoul (KR)

(58) Field of Classification Search
CPC ............... H04W 16/02; H04W 16/14; H04W 28/08; H04W 36/14; H04W 72/0453; H04W 76/028; H04W 48/20; H04W 72/048; H04W 88/06; H04W 36/08; H04W 36/0016; H04W 36/30; H04W 36/0061; H04W 36/0022; H04W 36/04; H04W 36/0072; H04W 36/38; H04W 72/04; H04W 48/12; H04W 48/01; H04W 24/10; H04W 28/0284; H04W 48/02; H04W 88/02; H04W 36/24; H04W 48/04; H04W 48/08
See application file for complete search history.

(56) References Cited

U.S. PATENT DOCUMENTS

| | | |
|---|---|---|
| 2010/0278142 A1 | 11/2010 | Dwyer et al. |
| 2010/0291941 A1* | 11/2010 | Chen ............... H04W 36/22 455/450 |
| 2011/0080895 A1 | 4/2011 | Iwamura et al. |
| 2012/0135732 A1* | 5/2012 | Magadi Rangaiah H04W 48/20 455/434 |
| 2014/0099969 A1* | 4/2014 | Hwang ............... H04W 48/06 455/453 |
| 2014/0329529 A1* | 11/2014 | Jung ............... H04W 36/16 455/436 |
| 2015/0304918 A1* | 10/2015 | Jung ............... H04W 48/20 455/436 |

OTHER PUBLICATIONS

PCT International Application No. PCT/KR2013/008130, Written Opinion of the International Searching Authority dated Dec. 2, 2013, 1 page.

Nokia Siemens Networks, et al., "RAN overload handling using RRC Reject", 3GPP TSG-RAN WG2 Meeting #79, R2-123682, Aug. 7, 2012, 2 pages.

Qualcomm Incorporated, et al., "MBMS Multibands Cell Reselection", 3GPP TSG-RAN2 Meeting #75, R2-113926, Aug. 15, 2011, 4 pages.

Nokia Corporation, et al., "NW failure and UE reselection", 3GPP TSG-RAN WG2 Meeting #78, R2-122530, May 14, 2012, 6 pages.

European Patent Office Application No. 13835813.0, Search Report dated Apr. 15, 2016, 11 pages.

* cited by examiner

PRIORITY HANDLING-BASED CELL RESELECTION METHOD IN WIRELESS COMMUNICATION SYSTEM AND APPARATUS FOR SUPPORTING THE METHOD

CROSS-REFERENCE TO RELATED APPLICATIONS

This application is the National Stage filing under 35 U.S.C. 371 of International Application No. PCT/KR2013/008130, filed on Sep. 9, 2013, which claims the benefit of U.S. Provisional Application Ser. Nos. 61/697,815, filed on Sep. 7, 2012, and 61/706,737, filed on Sep. 27, 2012, the contents of which are all hereby incorporated by reference herein in their entirety.

BACKGROUND OF THE INVENTION

1. Field of the Invention

The present invention relates to wireless communications and, more particularly, to a cell reselection method based on a priority handling in wireless communication systems and an apparatus for supporting the same.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

In wireless communication systems, a cell having narrow coverage such as a micro cell, a femto cell, a pico cell, and the like may be installed in a specific location within the coverage of the macro cell having wide coverage.

Due to a mobility of a user equipment as a mobile devices, the quality of service which is currently provided for the user equipment may be degraded or the user equipment may detect a cell that can provide better service. According, the user equipment may move to a new cell, which is called the mobility performance of the user equipment.

In a procedure for a cell reselection, the user equipment selects a target cell based on priorities of frequencies. And then, the user equipment tries to connect to the target cell by transmitting a connection configuration message. When the connection to the target cell completes, the user equipment may receive a service from the target cell.

In a certain case, the request of the user equipment may be rejected for various reasons, e.g. an overload of the target cell, and accordingly, the user equipment performs the cell reselection procedure again based on the priorities. The user equipment may select the cell that rejected the connection request, and the selected cell is still in a situation where the cell cannot provide a normal service. As a result, the user equipment repeatedly performs the cell reselection, but cannot receive any service from a network. Therefore, some mechanism to enable the network to control the cell reselection operation of user equipment may be needed, in case that the request for connection is rejected. For this, a method of lowering a priority of one or more frequencies may be considered. According to this, in the corresponding frequency, a lowest priority, that is, a lower priority which is lower than any other priority configured by the network.

In a situation that lowering priority is applied for a predetermined frequency, the user equipment may detect that a cell providing a predetermined service or that is available to provide better service is present in the corresponding frequency. In this case, a contradictory operation of the user equipment may be occurred on whether to apply the lowest priority or the highest priority to the corresponding frequency. In this situation, if the user equipment applies the lowest priority to the corresponding frequency, the user equipment may not select a cell on the corresponding frequency for a target cell through the cell reselection, as a result, the user equipment may not move to the cell that is available to provide better service.

SUMMARY OF THE INVENTION

The technical object of the present invention is to provide to a cell reselection method based on a priority handling in wireless communication systems and an apparatus for supporting the same.

In an aspect, a method for performing a cell reselection by a user equipment in a wireless communication system is provided. The method comprises acquiring information indicating to apply a lowest priority to a predetermined frequency, operating by applying the lowest priority to the predetermined frequency, applying a highest priority to the predetermined frequency, in case of detecting a cell of a predetermined type when operating and performing the cell reselection based on the applied lowest priority and highest priority.

The method may further comprise driving a timer when acquiring the information, wherein operating by applying the lowest priority to the predetermined frequency is performed while the timer is driving.

The information indicating to apply the lowest priority may include information indicating duration of the timer.

The information indicating to apply a lowest priority may be transmitted with being included in a connection rejection message transmitted from a network to the user equipment according to a connection rejection between the user equipment and the network.

The cell of a predetermined type may be a cell providing a multimedia broadcast multimedia service (MBMS) that the user equipment is interested in the predetermined frequency.

Detecting the cell of a predetermined type may be performed through system information transmitted from the cell of a predetermined type.

The cell of a predetermined type may be a member-CGS cell of the user equipment operated in the frequency and a highest ranked cell in the predetermined frequency.

In another aspect, a wireless apparatus operated in a wireless communication system is provided. The wireless apparatus comprises a radio frequency (RF) unit that transmits and receives a radio signal and a processor operating functionally connected with the RF unit. The processor is configured to perform, acquiring information indicating to apply a lowest priority to a predetermined frequency, operating by applying the lowest priority to the predetermined frequency, applying a highest priority to the predetermined frequency, in case of detecting a cell of a predetermined type when operating and performing the cell reselection based on the applied lowest priority and highest priority.

In still another aspect, a method for performing a cell reselection by a user equipment in a wireless communication system is provided. The method comprises operating by applying a highest priority to a predetermined frequency according to a cell detection of a predetermined type, applying a lowest priority to the predetermined frequency, when acquiring information indicating to apply the lowest priority and performing the cell reselection based on the applied lowest priority and highest priority.

The method may further comprise driving a timer when acquiring the information, wherein applying the lowest priority to the predetermined frequency is performed while the timer is driving.

The information indicating to apply the lowest priority may include information indicating duration of the timer.

The information indicating to apply a lowest priority may be transmitted with being included in a connection rejection message transmitted from a network to the user equipment according to a connection rejection between the user equipment and the network.

The method may further comprise stopping applying the lowest priority to the predetermined frequency and applying the highest priority to the predetermined frequency again, if the timer is expired.

The cell of a predetermined type may be a cell providing a multimedia broadcast multimedia service (MBMS) that the user equipment is interested in the predetermined frequency.

Detecting the cell of a predetermined type may be performed through system information transmitted from the cell of a predetermined type.

The cell of a predetermined type may be a member-CGS cell of the user equipment operated in the frequency and a highest ranked cell in the predetermined frequency.

According to a cell reselection method according to an embodiment of the present invention, a user equipment may select a proper target cell through a priority adjustment. In case that a collision occurs due to both of the lowest priority application and the highest priority application being required, the user equipment may avoid the collision through applying consistent predetermined priority, and perform the cell reselection based on the priority. The user equipment may camp on the cell selected through the cell reselection and try to access. Through this, the user equipment may be provided with more improved service or desired service.

DESCRIPTION OF EXEMPLARY EMBODIMENTS

Figure 1:
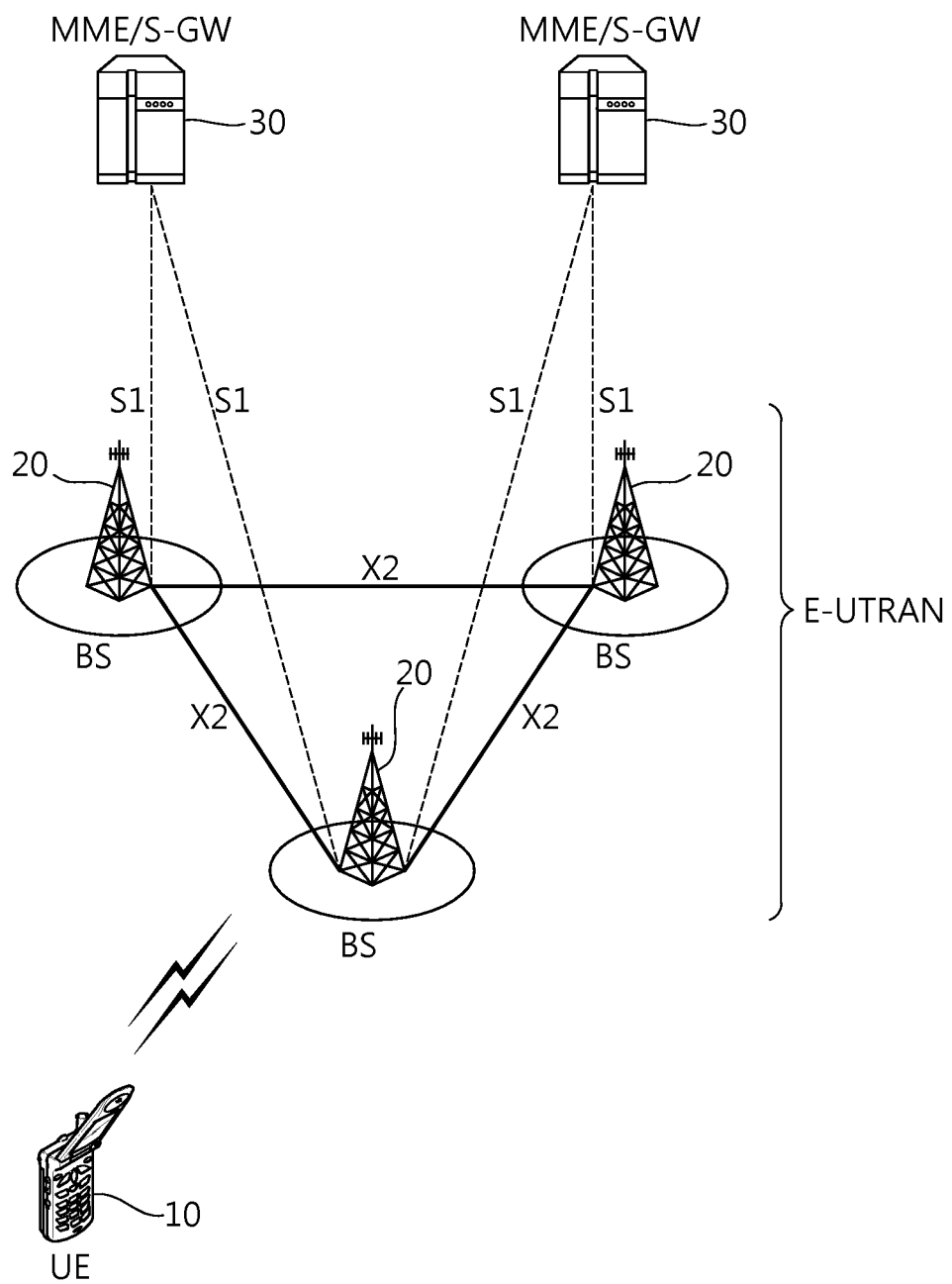
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
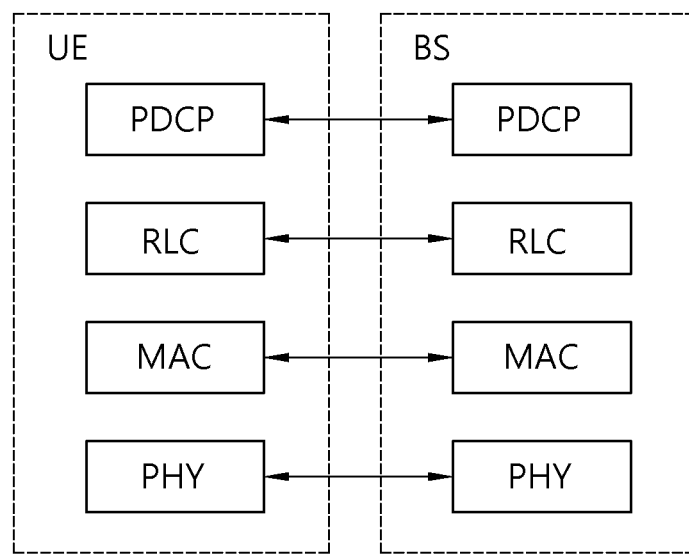
FIG. 2 is a block diagram showing the structure of a wireless protocol on the user plane.
Figure 3:
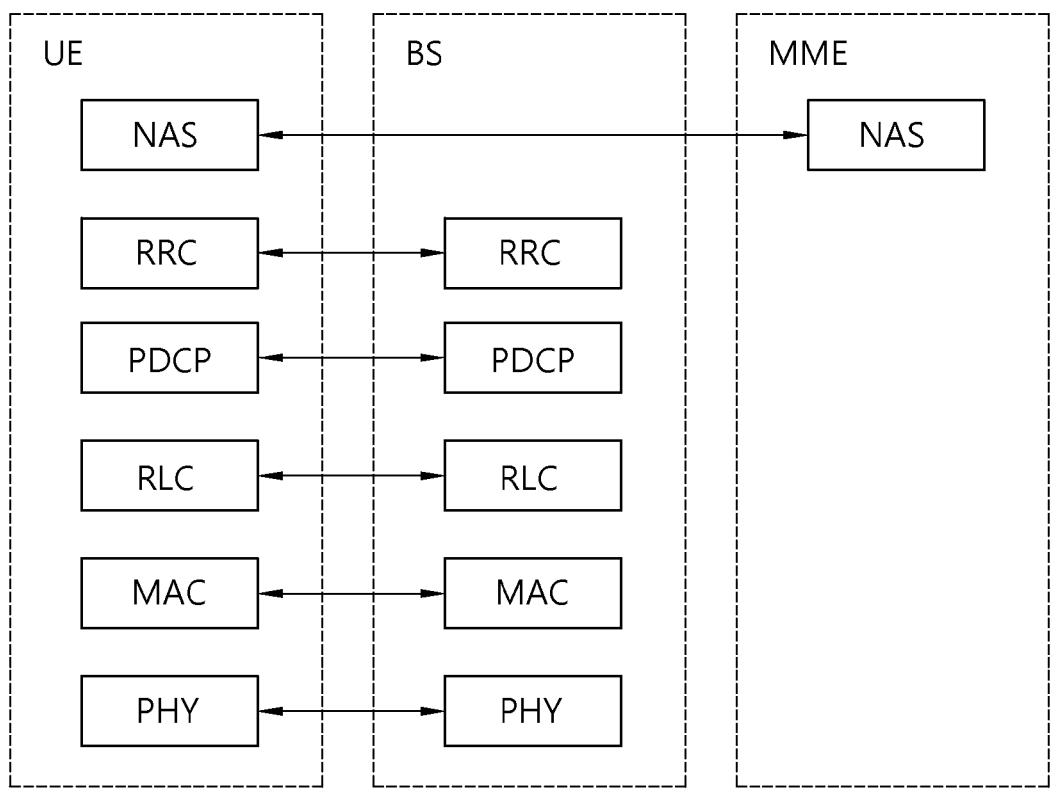
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell.

In accordance with Paragraph 5.2.2 of 3GPP TS 36.331 V8.7.0 (2009-09) "Radio Resource Control (RRC); Protocol specification (Release 8)", the system information is classified into a Master Information Block (MIB), a Scheduling Block (SB), and a System Information Block (SIB). The MIB informs UE of the physical configuration of a corresponding cell, for example, a bandwidth. The SB informs UE of information about the transmission of SIBs, for example, a transmission cycle. The SIB is a set of pieces of correlated system information. For example, a specific SIB includes only information about surrounding cells, and a specific SIB includes only information about an uplink radio channel used by UE.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
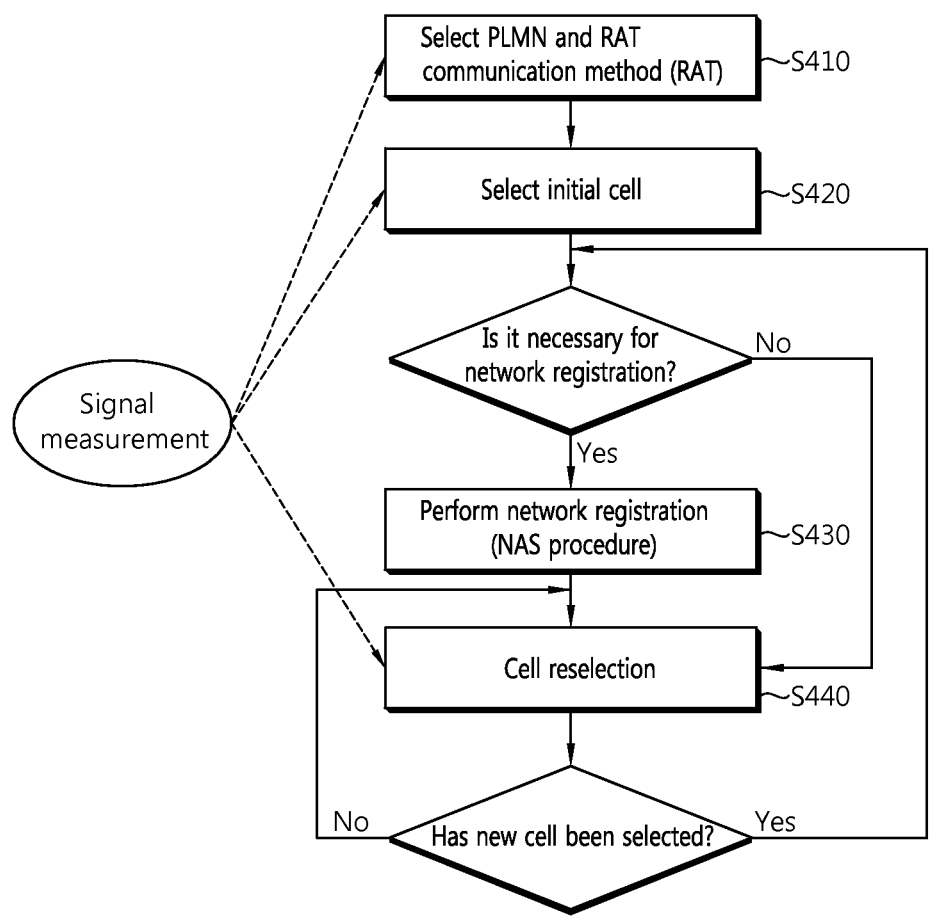
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
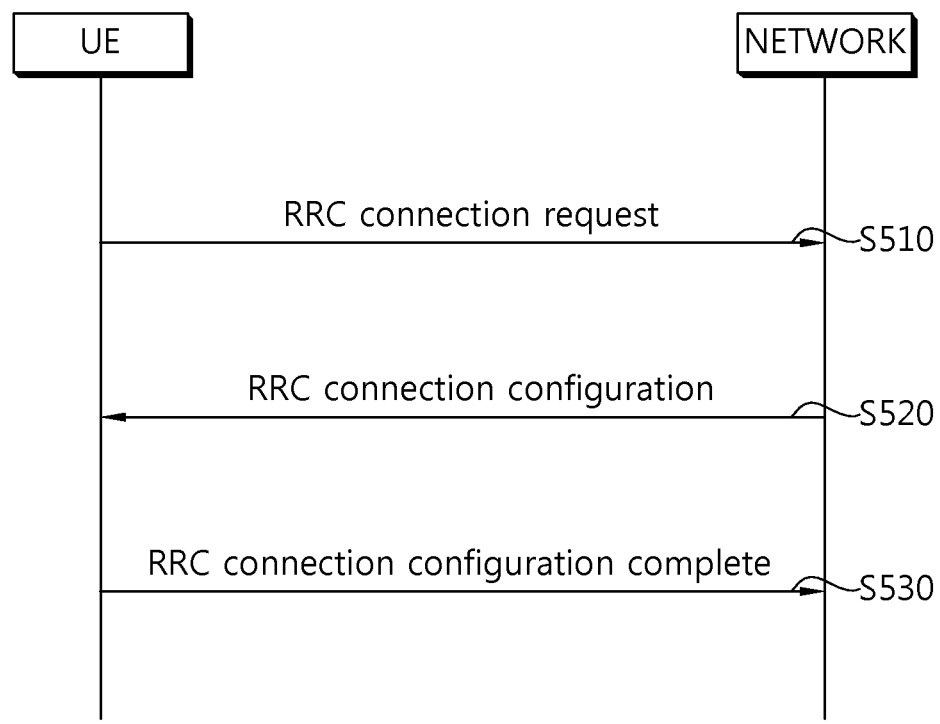
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
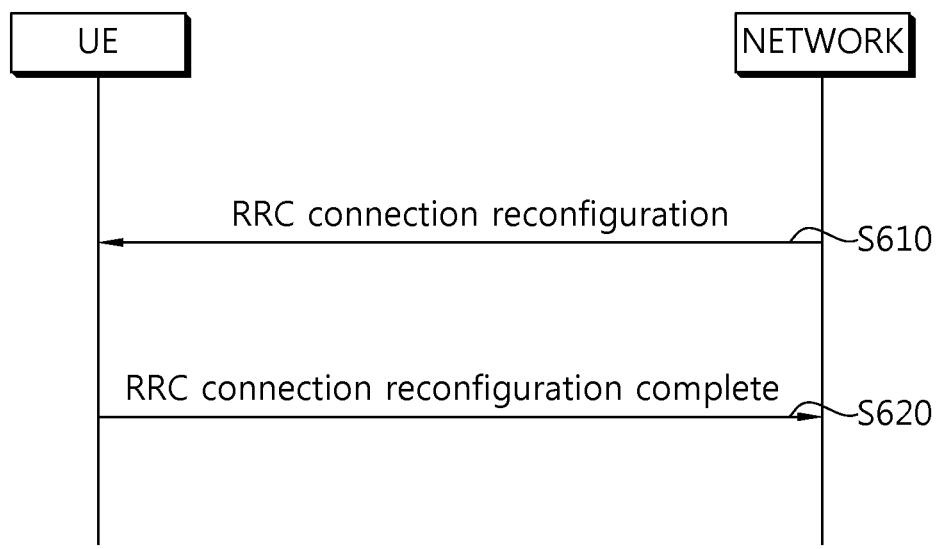
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) will be described.

The PLMN is a network that is deployed and operated by mobile network operators. Each mobile network operator operates one or more PLMN. Each PLMN may be distinguished by Mobile Country Code (MCC) and Mobile Network Code (MNC). The PLMN information of cells is included in the system information and broadcasted.

For selecting PLMN, cells and reselecting cells, various types of PLMNs may be considered by a UE.

HPLMN (Home PLMN): The PLMN having MCC and MNC which are respectively matched to MCC and MNC of a UE IMSI.

EHPLMN (Equivalent HPLMN): The PLMN handled to be equivalent to the HPLMN.

RPLMN (Registered PLMN): The PLMN of which the location is successfully registered.

EPLMN (Equivalent PLMN): The PLMN handled to be equivalent to the RPLMN.

Each consumer of the mobile service subscribes to the HPLMN. When the general service is provided for a UE through the HPLMN or the EHPLMN, the UE is not in the roaming state. On the other hand, a service is provided for a UE through the PLMN except the HPLMN/EHPLMN, the UE is in the roaming state, and the PLMN is called Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

Next, a procedure of a UE selecting a cell will be described in detail.

When power is turned on or being remained in a cell, the UE performs the procedures to be serviced by selecting/reselecting a cell of adequate quality.

The UE in the RRC idle state should select the cell of adequate quality always and be ready for being serviced through the cell. For example, the UE which is just turned on should select a cell of adequate quality in order to register a network. When the UE in the RRC connection state enters the RRC idle state, the UE should select the cell which is going to remain in the RRC idle state. As such, the procedure of selecting a cell satisfying a certain condition in order for the UE to remain in the service standby state such as the RRC idle state is called the Cell Selection. It is an important point to select the cell as quick as possible, since the cell selection is performed in the state that the cell where the UE remains in the RRC idle state is not yet determined. Accordingly, if the cell provides a high level of wireless signal quality, the cell can be selected in the procedure of cell selection although the cell is not a cell that provides the best wireless signal quality.

Now, with reference to 3GPP TS 36.304 V8.5.0 (2009-03) "User Equipment (UE) procedures in idle mode (Release 8)", the method and procedure that a UE select a cell in 3GPP LTE will be described.

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

The inter-frequency cell reselection is based on a frequency priority provided by the network. The UE attempts to camp on a frequency having the highest frequency priority. The network may provide the frequency priority to which UEs in cell will commonly apply through broadcast signaling or provide a frequency-dedicated priority for each UE through UE-dedicated signaling. The cell reselection priority provided through the broadcast signaling may be called the common priority, and the cell reselection priority setup by the network for each UE may be called the dedicated priority. When the UE receives the dedicated priority, the UE may receive the relevant validity time together with the dedicated priority. When the UE receives the dedicated priority, the UE starts the validity timer which is setup as the relevant validity time. The UE applies the dedicated priority in the RRC idle mode while the validity timer is operating. If the validity timer is terminated, the UE discards the dedicated priority and applies the common priority again.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst}, R_n = Q_{meas,n} - Q_{offset}$$

In this case, $R_s$ is the ranking criterion of a serving cell, $R_n$ is the ranking criterion of a neighbor cell, $Q_{meas,s}$ is the quality value of the serving cell measured by UE, $Q_{meas,n}$ is the quality value of the neighbor cell measured by UE, $Q_{hyst}$ is the hysteresis value for ranking, and $Q_{offset}$ is an offset between the two cells.

In Intra-frequency, if UE receives an offset "$Q_{offsets,n}$" between a serving cell and a neighbor cell, $Q_{offset} = Q_{offsets,n}$. If UE does not $Q_{offsets,n}$, $Q_{offset} = 0$.

In Inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighbor cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_s$ of a serving cell and $R_n$ of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Radio Link Monitoring (RLM) is described below.

UE monitors downlink quality based on a cell-specific reference signal in order to detect the quality of the downlink radio link of a PCell. The UE estimates the quality of a downlink radio link in order to monitor the quality of the downlink radio link of the PCell, and compares the estimated quality with threshold values Qout and Qin. The threshold value Qout is defined as a level at which a downlink radio link is unable to be stably received, which corresponds to a block error rate of 10% of hypothetical PDCCH transmission by taking into consideration a PDFICH error. The threshold value Qin is defined as a downlink radio link quality level at which a downlink radio link is able to be more stably received than compared to the level of Qout, which corresponds to a block error rate of 2% of hypothetical PDCCH transmission by taking into consideration a PDFICH error.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
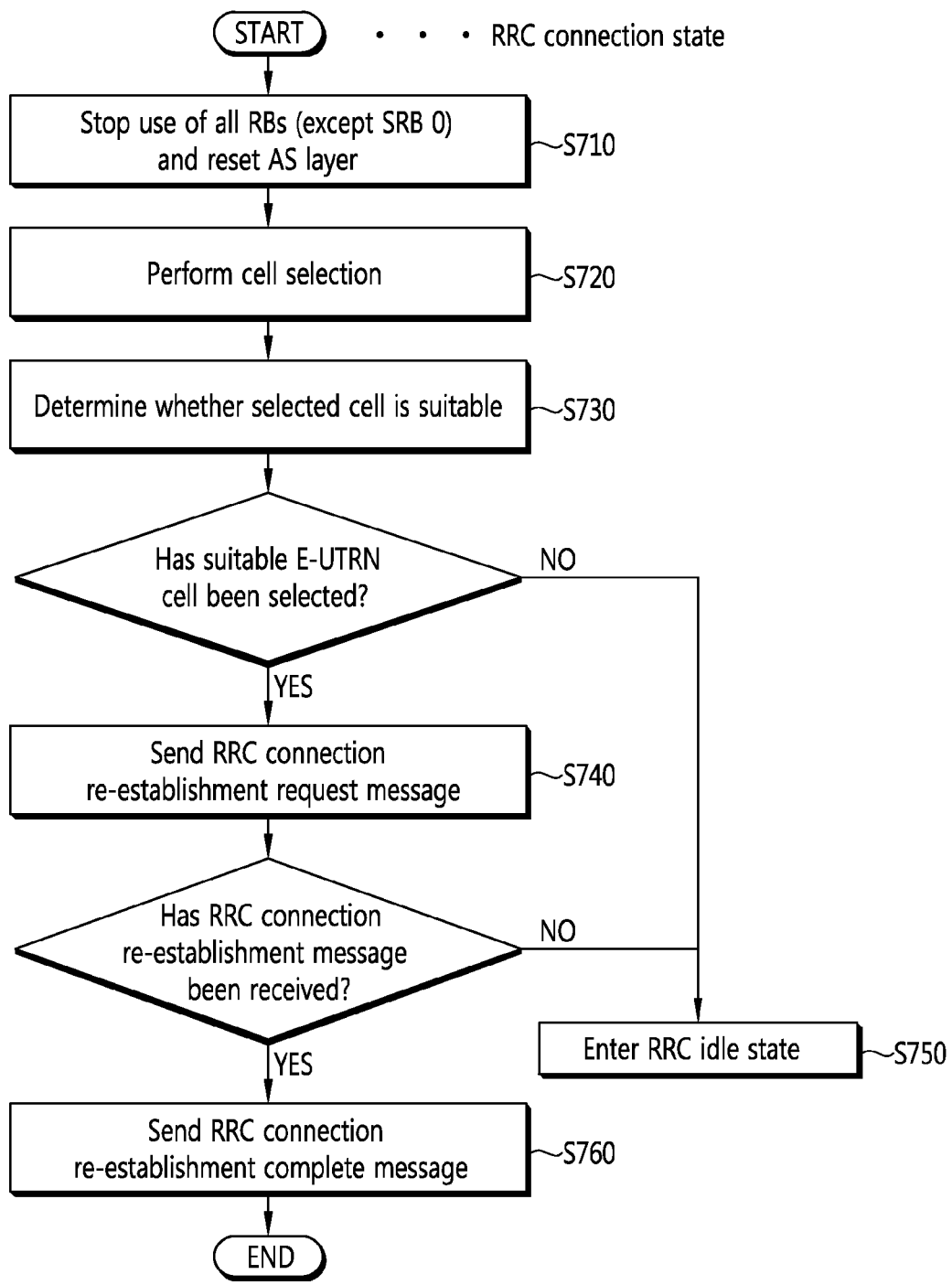
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331,a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1,and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

A report on an RLF is described below.

When an RLF occurs or a handover failure occurs, UE reports such a failure event to a network in order to support the Mobility Robustness Optimization (MRO) of the network.

After RRC connection re-establishment, the UE may provide the RLF report to the eNB. Wireless measurement includes in the RLF report may be used for a potential reason of a failure in order to identify coverage problems. Such information may be used to borrow such events as input to other algorithms by excluding the events in MRO evaluation for an intra-LTE mobility connection failure.

If RRC connection re-establishment fails or UE does not perform RRC connection re-establishment, the UE may be connected again in idle mode, and may generate a valid RLF report on an eNB. For such an object, the UE may store information related to the most recent RLF or handover failure, and may inform an LTE cell that an RLF report is valid every RRC connection (re)establishment and handover until the RLF report is fetched by a network or for 48 hours after an RLF or handover failure is detected.

The UE maintains the information for a state shift and a change of RAT, and indicates that the RLF report is valid again after returning back to LTE RAT.

In an RRC connection establishment procedure, the validity of an RLF report means that UE has experienced obstruction, such as a connection failure, and an RLF report attributable to the failure has not yet been transferred to a network. The RLF report from the UE includes the following information.

If the last cell (in the case of an RLF) that has provided service to the UE or the E-CGI of a target for handover has not been known, a PCI and frequency information are used instead.

The E-CGI of a cell at which re-establishment has been attempted.

When initializing the last handover, for example, when a message 7 (an RRC connection reconfiguration) is received by the UE, the E-CGI of a cell that has provided service to the UE.

The time that has elapsed from the initialization of the last handover to a connection failure.

Information indicative of whether the connection failure is attributable to an RLF or a handover failure.

Wireless measurements.

The location of a failure.

The eNB that has received the RLF from the UE may forward the report to an eNB that had provided service to the UE prior to the reported connection failure. Wireless measurements included in the RLF report may be used to identify coverage issues as a potential cause of an RLF. Such information may be used to send events to other algorithm as input again by excluding the events from the MRO evaluation of an intra-LTE mobility connection failure.

Measurement and a measurement report are described below.

In a mobile communication system, to support the mobility of UE is essential. Accordingly, the UE continues to measure the quality of a serving cell from which the UE is now provided with service and the quality of a neighbor cell. The UE reports measured results to a network on a proper time, and the network provides optimum mobility to the UE through handover, etc. In general, measurement for this purpose is called a Radio Resource Management (RRM) measurement.

In order to provide information that may help an operator to operate a network in addition to the mobility support object, UE may perform measurement for a specific object set by the network, and may report measured results thereof to the network. For example, UE receives the broadcast information of a specific cell that has been determined by the network. The UE may report the cell identity (this is also called a global cell identity) of the specific cell, identity information about the location to which the specific cell belongs (e.g., Tracking Area Code) and/or other pieces of cell information (e.g., whether or not it is a member of a Closed Subscriber Group (CSG) cell) to the serving cell.

If UE checks that the quality of a specific area is very poor through measurement while moving, the UE may report location information and measured results for cells having poor quality to a network. A network may perform network optimization based on the reports of the measured results of UEs that help the operation of the network.

In a mobile communication system in which frequency reuse (frequency reuse factor) is 1, mobility is chiefly performed between difference cells that belong to the same frequency band. Accordingly, in order to well guarantee the mobility of UE, the UE needs to well measure the quality of neighboring cells having the same center frequency as a serving cell and information about the cells. As described above, the measurement of a cell having the same center frequency as a serving cell is called intra-frequency measurement. UE performs intra-frequency measurement and reports measured results thereof to a network on a proper time so that the object of corresponding measured results is achieved.

A mobile communication operator may operate a network using a plurality of frequency bands. If the service of a communication system is provided through a plurality of frequency bands, in order to guarantee optimum mobility for UE, the UE needs to well measure the quality of neighboring cells having center frequencies from the center frequency of a serving cell and information about the cells. As described above, the measurement of a cell having a center frequency different from the center frequency of a serving cell is called inter-frequency measurement. UE needs to be able to perform inter-frequency measurement and to report measured results thereof to a network on a proper time.

If UE supports the measurement of a heterogeneous network, the UE may measure the cell of a heterogeneous network according to a BS configuration. The measurement of such a heterogeneous network is called inter-Radio Access Technology (RAT) measurement. For example, RAT may include an UMTS Terrestrial Radio Access Network (UTRAN) and a GSM EDGE Radio Access Network (GERAN) that comply with the 3GPP standard, and may also include CDMA 2000 systems that comply with the 3GPP2 standard.

Figure 8:
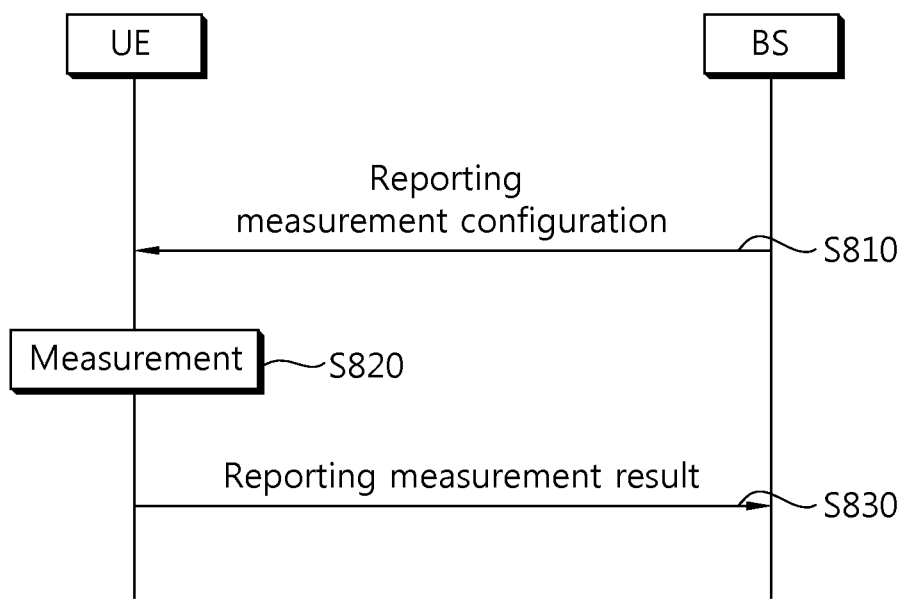
FIG. 8 is a flowchart illustrating a method of performing measurement.

FIG. 8 is a flowchart illustrating the existing method of performing measurement.

A UE receives the measurement configuration information from a BS (step, S810). The message that includes the measurement configuration information is called a measurement configuration message. The UE performs the measurement based on the measurement configuration information (step, S820). If the measurement result satisfies the report condition in the measurement configuration information, the UE reports the measurement result to the BS (step, S830). The message that includes the measurement result is called a measurement report message.

The measurement configuration information may include the following information.

(1) Measurement object information: Represents information on the object for which the UE will perform the measurement. The measurement object includes at least one among an intra-frequency measurement object which is the object of an intra-measurement, an inter-frequency measurement object which is the object of an inter-measurement, and an inter-RAT measurement object which is the object of an inter-RAT measurement. For example, the intra-frequency measurement object may indicate a neighboring cell having the same frequency band as the serving cell, the inter-frequency measurement object may indicate a neighboring cell having a different frequency band from the serving cell, and the inter-RAT measurement object may indicate a neighboring cell having different RAT from the serving cell.

(2) Reporting configuration information: Represents information on the reporting condition and the report type regarding when the UE reports the measurement result. The reporting condition may include information on an event or a cycle that triggers reporting the measurement result. The report type represents information regarding in which type the measurement result is configured.

(3) Measurement identity information: Represents information on the measurement identity to decide which measurement object, at a time when, and in which type the UE reports by associating the measurement object with the report configuration. The measurement identity information is included in the measurement report message, and as a result, it can represent that for which measurement object the measurement result is and under which reporting condition the measurement report occurs.

(4) Quantity configuration information: Represents information on the parameter for configuring filtering a measurement unit, a report unit, and/or a measurement result value.

(5) Measurement gap information: Represents information on the measurement gap which is an interval that the UE may use only for the measurement without considering data transmission with the serving cell because downlink transmission or uplink transmission is not scheduled.

The UE has a measurement object list, a measurement report configuration list, and a measurement identity list in order to perform the measurement procedure.

In the 3GPP LTE, the BS may configure only one measurement object for one frequency band to the UE. According to Phrase 5.5.4 of 3GPP TS 36.331 V8.5.0 (2009-03) "Evolved Universal Terrestrial Radio Access (E-UTRA) Radio Resource Control (RRC); Protocol specification (Release 8)", events that trigger a measurement report illustrated in a table described below are defined.

TABLE 1

| Event | Reporting conditions |
|---|---|
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

When the measurement result by the UE satisfies the configured event, the UE transmits the measurement report message to the BS.

Figure 9:
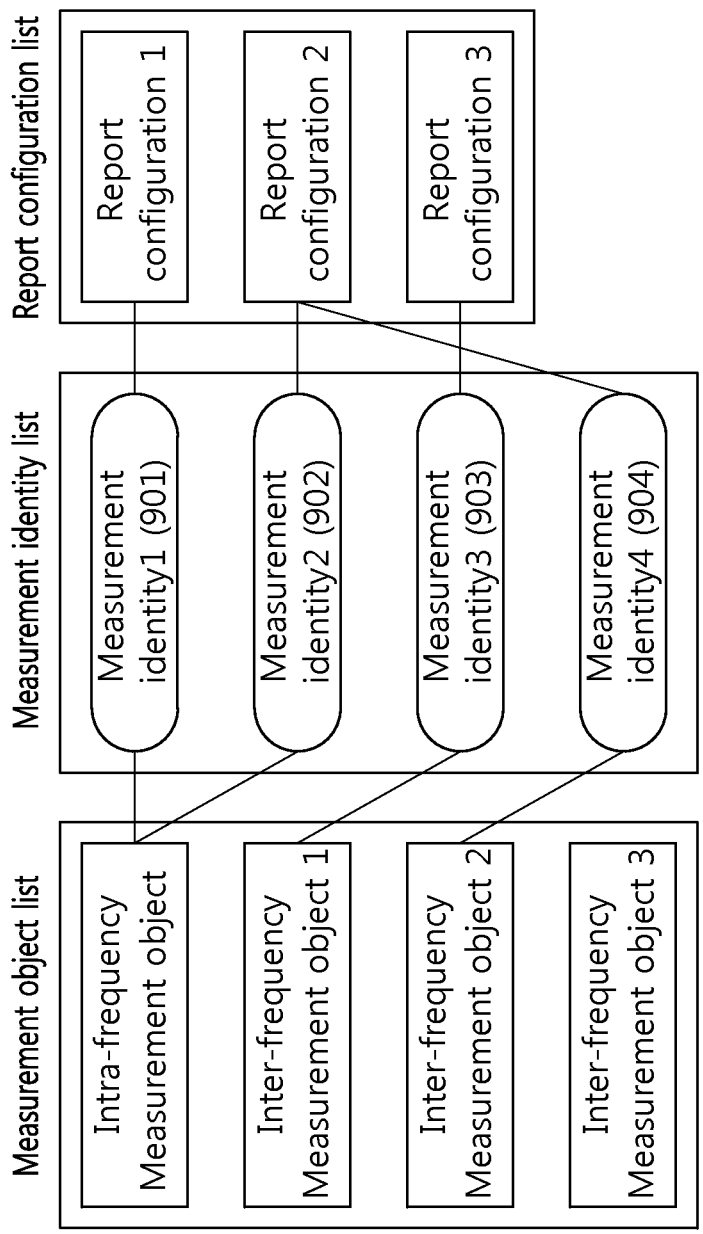
FIG. 9 illustrates an example of a measurement configuration configured to UE.

FIG. 9 illustrates an example of a measurement configuration configured to UE.

First, a measurement identity 1 901 connects an intra-frequency measurement object and a reporting configuration 1. UE performs intra-cell measurement (intra-frequency measurement), and the reporting configuration 1 is used to determine the criterion of a measurement result report and a report type.

A measurement identity 2 902 is connected to the intra-frequency measurement object like the measurement identity 1 901, but it connects the intra-frequency measurement object to a reporting configuration 2. UE performs measurement, and the reporting configuration 2 is used to determine the criterion of a measurement result report and a report type.

In accordance with the measurement identity 1 901 and the measurement identity 2 902, UE sends the measured results of the intra-frequency measurement object although the measured results satisfy any one of the reporting configuration 1 and the reporting configuration 2.

A measurement identity 3 903 connects an inter-frequency measurement object 1 and a reporting configuration 3. UE reports the measured results of the inter-frequency measurement object 1 if the measured results satisfy report conditions included in the reporting configuration 1.

A measurement identity 4 904 connects an inter-frequency measurement object 2 and the reporting configuration 2. UE reports the measured results of the inter-frequency measurement object 2 if the measured results satisfy report conditions included in the reporting configuration 2.

Meanwhile, a measurement object, a reporting configuration and/or a measurement identity may be added, changed and/or deleted. This may be indicated in such a manner that a BS sends a new measurement configuration message to UE or sends a measurement configuration change message to the UE.

Figure 10:
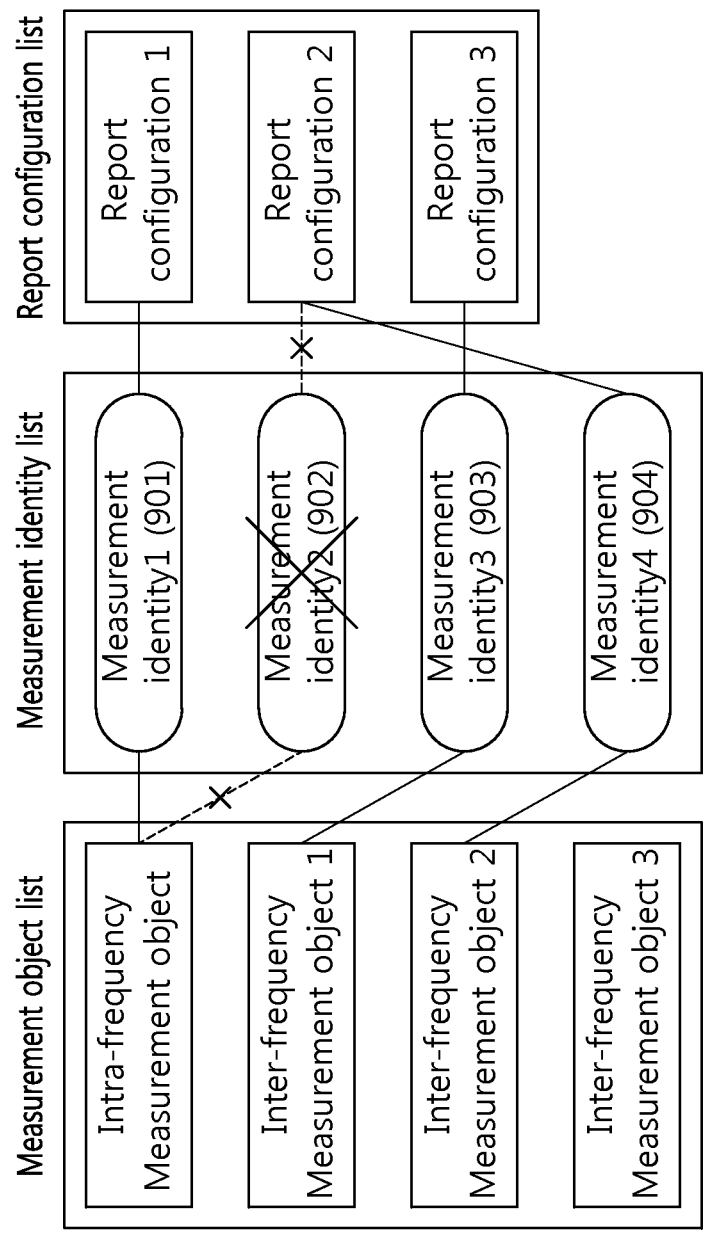
FIG. 10 illustrates an example in which a measurement identity is deleted.

FIG. 10 illustrates an example in which a measurement identity is deleted. When a measurement identity 2 902 is deleted, the measurement of a measurement object associated with the measurement identity 2 902 is stopped, and a measurement report is not transmitted. A measurement object or a reporting configuration associated with a measurement identity may not be changed.

Figure 11:
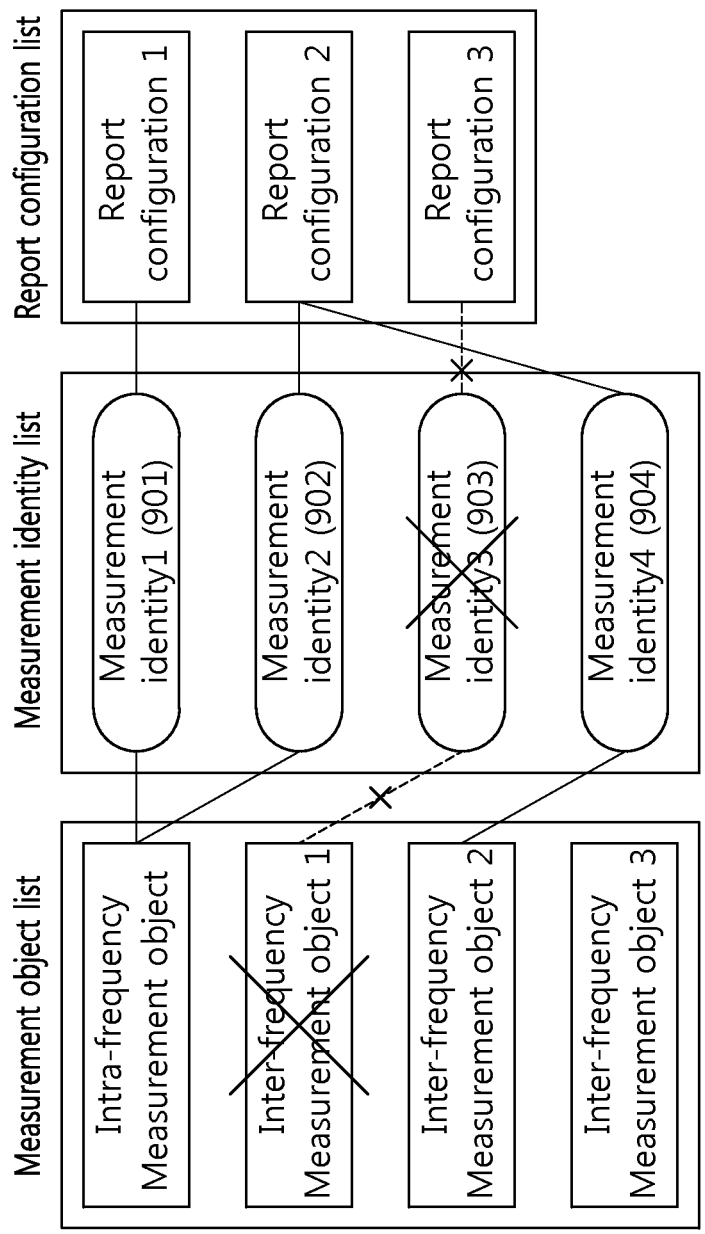
FIG. 11 illustrates an example in which a measurement object is deleted.

FIG. 11 illustrates an example in which a measurement object is deleted. When an inter-frequency measurement object 1 is deleted, UE also deletes an associated measurement identity 3 903. The measurement of the inter-frequency measurement object 1 is stopped, and a measurement report is not transmitted. However, a reporting configuration associated with the deleted inter-frequency measurement object 1 may not be changed or deleted.

When a reporting configuration is removed, UE also removes an associated measurement identity. The UE stops the measurement of a measurement object associated by the associated measurement identity. However, a measurement object associated with a deleted reporting configuration may not be changed or deleted.

A measurement report may include a measurement identity, the measured quality of a serving cell, and the measured results of a neighboring cell. A measurement identity identifies a measurement object whose measurement report has been triggered. The measured results of a neighboring cell may include the cell identity and measured quality of the neighboring cell. Measured quality may include at least one of Reference Signal Received Power (RSRP) and Reference Signal Received Quality (RSRQ).

Subsequently, an H(e)NB will be described.

A mobile communication service may be provided via a base station (BS) owned by an individual or a particular provider or group, besides a mobile communication network carrier. Such a BS is called a home NB (HNB) or a home eNB (HeNB). HNB and HeNB will be referred to as HeNB. An HeNB basically aims at providing a service specified for only a closed subscriber group (CSG). However, an HeNB may also provide a service to users other than a CSG according to setting of an operation mode.

Figure 12:
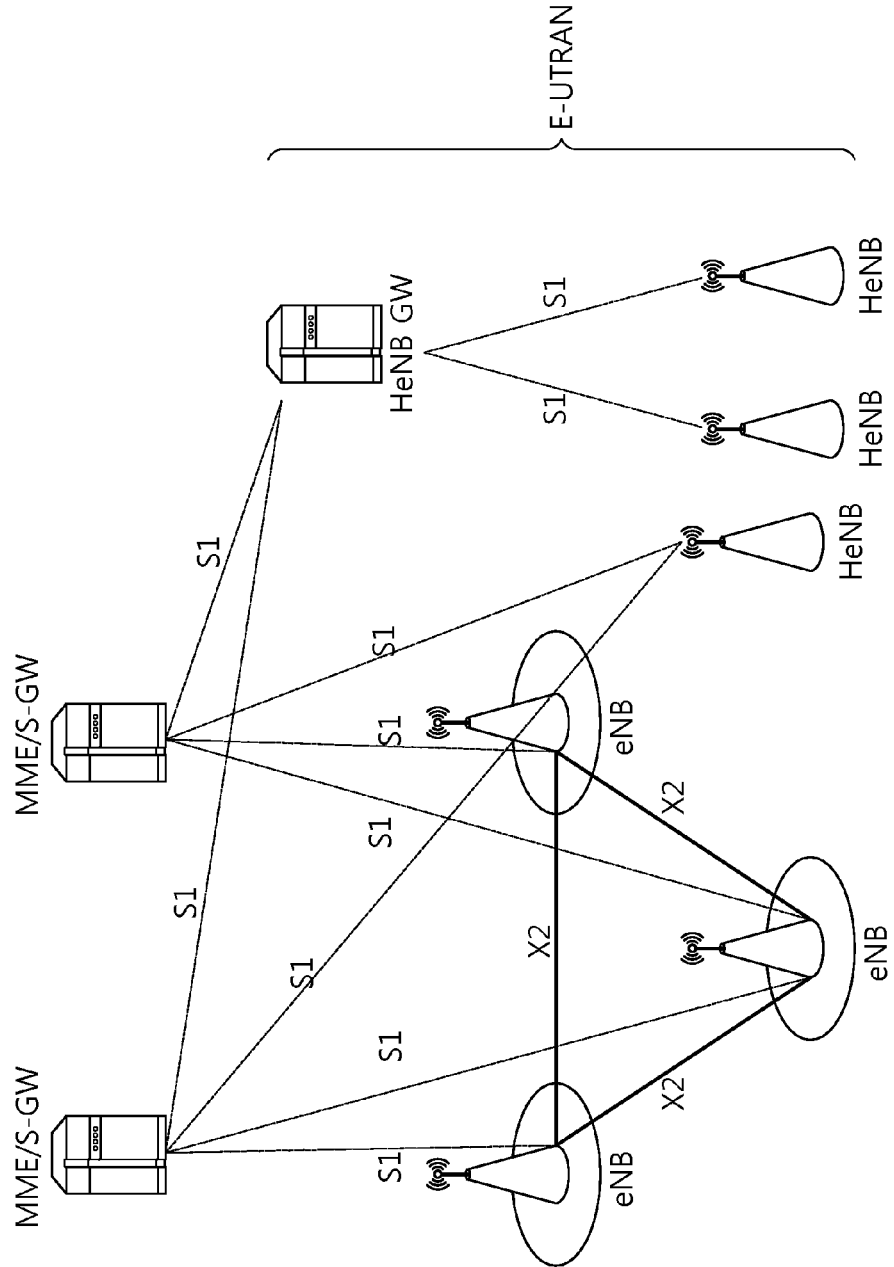
FIG. 12 is a diagram illustrating an example of a wireless communication system providing an HeNB operation.

FIG. 12 is a diagram illustrating an example of a wireless communication system providing an HeNB operation.

Referring to FIG. 12, in order to provide HeNB service, a home eNB gateway (HeNB GW) may be operated. HeNBs may be connected to an EPC through the HeNB GW or directly connected to the EPC. For MMEs, the HeNB GW seems to be a normal eNB. For HeNBs, the HeNB GW seems to be an MME. Thus, the HeNBs and the HeNB GW are connected by an S1 interface, and the HeNB GW and the EPC are also connected by an S1 interface. Also, when the HeNBs and the EPC are directly connected, they are connected by an S1 interface. Functions of the HeNBs are mostly identical to those of a normal eNB.

In general, a wireless transmission output of an HeNB is low, relative to an eNB owned by a mobile communication network provider. Thus, coverage provided by an HeNB is generally smaller than that provided by an eNB. Due to such characteristics, a cell provided by an HeNB is classified as a femto cell, in comparison to a macro cell provided by an eNB in terms of coverage. Meanwhile, in terms of provided service, when an HeNB provides a service only to a CSG group, a cell provided by the HeNB is called a CSG cell.

Each CSG has a unique identification number, and the identification number is called a CSG identity (ID). A UE may have a list of CSGs to which the UE belongs as a member, and the CSG list may be altered according to a UE request or a command of a network. In general, a single HeNB may support a single CSG.

An HeNB delivers a CSG ID of a CSG supported by the HeNB through system information to allow only member UEs of the corresponding CSG to access. When a UE discovers a CSG cell, the UE may check what kind of CSG the CSG cell supports by reading a CSG ID included in system information. Upon receiving the CSG ID, the UE may regard the corresponding cell as a cell that the UE may access only when the UE is a member of the corresponding CSG cell.

An HeNB may not need to permit only a CSG UE to access all the time. Namely, an HeNB may permit a UE, not a CSG member, to access according to a configuration setting of the HeNB. Which UE is permitted to access may be changed according to a configuration setting of an HeNB, and here, a configuration setting refers to a setting of an operation mode of the HeNB. The operation mode of the HeNB is classified into three modes depending on to which UEs a service is provided.

Closed access mode: A mode providing a service only to a particular CSG member. An HeNB provides a CSG cell.

Open access mode: A mode in which a service is provided without restriction such as a particular CSG member like a normal eNB. An HeNB provides a normal cell, rather than a CSG cell.

Hybrid access mode: A mode in which a CSG service may be provided to a particular CSG member and a service is provided to a non-CSG member, like a normal cell. For a CSG member UE, a cell is recognized as a CSG cell, and for a non-CSG member UE, the cell is recognized as a normal cell. Such a cell is called a hybrid cell.

An HeNB informs a UE about whether a cell served by the HeNB is a CSG cell and a normal cell to allow to UE to know whether the corresponding cell is accessible. An HeNB operated in the closed access mode broadcasts that the HeNB is a CSG cell, through system information. An HeNB operated in the open access mode broadcasts that the HeNB is not a CSG cell, through system information. In this manner, the HeNB includes a 1-bit CSG indicator indicating whether the cell served by the HeNB is a CSG cell or not, in system information. For example, in case of a CSG cell, a CSG indicator is set to TRUE and broadcast. If a served cell is not a CSG cell, the CSG indicator may be set to FALSE or transmission of a CSG indicator may be omitted. A UE needs to discriminate a normal cell served by an eNB from a CSG cell, a normal eNB may also transmit a CSG to allow a UE to recognize that a cell type served by the eNB is a normal cell. The normal eNB may not transmit a CSG indicator so that a UE recognizes that a cell type served by the eNB is a normal cell. Table 2 shows CSG-related parameters transmitted in corresponding cells by cell type. Table 3 shows types of UEs allowed for accessing by cell type.

TABLE 2

|  | CGS cell | Normal cell |
| --- | --- | --- |
| CGS indicator | Indicates 'CSG cell' | Indicates 'Non-CSG cell' or not transmitted |
| CSG identifier | Supported CSG identifier is transmitted | Not transmitted |

TABLE 3

|  | CSG cell | Normal cell |
| --- | --- | --- |
| UE not supporting CSG | inaccessible | accessible |
| Non-CSG member UE | inaccessible | accessible |
| member CSG UE | accessible | accessible |

In a certain frequency, a CSG cell and a (normal) macro cell are operated simultaneously, which is called a mixed carrier frequency. A network may reserve a particular physical layer cell identity in the mixed carrier frequency, for a CSG cell. The physical layer cell identity is called a PCI (Physical Cell Identity) in the E-UTRAN, and is called a PSC (Physical scrambling code) in the UTRAN. For the description purpose, the physical layer cell identity will be expressed as a PCI. In the mixed carrier frequency, a CSG cell provides information regarding a PCI reserved for the CSG in a current frequency, through system information. Upon receiving the information, when the UE discovers a certain cell in the corresponding frequency, the UE may be able to determine whether or not the cell is a CSG cell from the PCI of the cell.

In case of a UE that does not support a CSG related function or does not have a CSG list to which the UE belongs as a member, the UE may not need to regard a CSG cell as a selectable cell in the cell selection/re-selection process. In this case, the UE checks only the PCI of the cell, and when the PCI is a PCI reserved as a CSG, the UE may immediately exclude the corresponding cell in the cell selection/re-selection process. In general, a PCI of a certain cell may be immediately known in the process in which a physical layer of the UE checks the presence of a corresponding cell.

In case of a UE that has a CSG list to which the UE belongs as a member, when the UE wants to know a list regarding adjacent CSG cells in the mixed carrier frequency, if the UE discovers only a cell having a PCI reserved for a CSG, it can know that the corresponding cell is a CSG cell, rather than checking CSG identifiers of system information of all the cells discovered in the entire PCI range one by one.

Hereinafter, a cell re-selection process in relation to a CSG cell will be described.

A CSG cell is a cell for providing a better service to a corresponding CSG member UE. Thus, when the UE is camped on in the CSG cell, it may not be desirous in terms of quality of service (QoS) if the UE discovers an inter-frequency having frequency priority higher than that of a serving frequency and re-selects a cell of the inter-frequency.

In order to prevent the UE from unconditionally re-select a cell by inter-frequency having frequency priority higher than that of the serving frequency when the UE is camped on in the CSG, it is assumed that when a CSG cell of a certain frequency is best ranked according to a cell re-selection evaluation reference in the frequency, frequency priority of the corresponding frequency is higher than that of other frequencies. In this manner, when the UE designates frequency priority (priority higher than priority of 8 class designated by a network) higher than frequency priority that may be designated by a network with respect to a particular frequency, such frequency priority is called implicit highest priority. By doing that, it helps the UE is camped on in the CSG cell, while the rule in the existing cell selection that frequency priority is first considered when the UE performs cell re-selection. If the UE in the CSG cell re-selects a non-CSG cell of the corresponding frequency, the UE may withdraw the implicit highest priority assumption with respect to the corresponding frequency and uses the frequency priority value transferred from the network in evaluating cell re-selection. If a different CSG cell best linked in a frequency having the same frequency priority is discovered when the UE is camped on in the CSG cell, whether the UE re-selects the CSG cell or whether the UE remains in the CSG cell in which it is currently camped on follows an implementation of the UE.

Hereinafter, a multimedia broadcast and multicast service (MBMS) will be described in detail.

An MCCH channel or an MTCH channel, a logical channel, may be mapped to an MCH channel, a transport channel, for an MBMS. The MCCH channel transmits an MBMS-related RRC message, and the MTCH channel transmits traffic of a particular MBMS service. There is a single MCCH channel in every MBMS single frequency network (MBSFN) transmitting the same MBMS information/traffic, and when a plurality of MBSFN areas are provided in a cell, a UE may receive a plurality of MCCH channels. When an MBMS-related RRC message is changed in a particular MCCH channel, a PDCCH channel transmits an MBMS radio network temporary identity (M-RNTI) and an indicator indicating a particular MCCH channel. A UE supporting the MBMS receives the M-RNTI and the MCCH indicator through a PDCCH channel, recognizes that an MBMS-related RRC message has been changed in the particular MCCH channel, and receives the particular MCCH channel. The RRC message of the MCCH channel may be changed at every change period and may be periodically broadcast at every repetition period.

While being provided with the MBMS service, the UE may receive a dedicated service. For example, a certain user may view a TV using an MBMS service through his or her smart phone, while chatting using an instant messaging (IM) service such as MSN or Skype through the smart phone. In this case, the MBMS service may be provided through an MTCH received by several UEs together, and the service individually provided to each UE like the IM service may be provided through a dedicated bearer such as a DCCH or a DTCH.

In an area, a certain BS may use several frequencies simultaneously. In this case, in order to effectively use radio resource, a network may select one of the several frequencies, provides an MBMS service only in the frequency, and provides a dedicated bearer to each UE in every frequency.

In this case, in a case in which a UE, served using a dedicated bearer in a frequency in which an MBMS service is not provided, wants to receive an MBMS service, the UE needs to perform handover to a frequency in which the MBMS is provided. To this end, the UE transmits an MBMS interest indicator to the BS. Namely, when the UE wants to receive an MBMS service, the UE transmits an MBMS interest indicator to the BS, and upon receiving the MBMS interest indicator, the UE recognizes that the UE wants to receive an MBMS service, and shifts the UE to a frequency in which the MBMS is provided. Here, the MBMS interest indicator refers to information indicating that the UE wants to receive an MBMS service and additionally includes information regarding to which frequency the UE wants to shift.

When the UE wants to receive a particular MBMS service, the UE first recognizes information regarding a frequency in which the MBMS service is provided and broadcast time information. When the MBMS has already been broadcast or is about to start, the UE sets priority of the frequency in which the MBMS service is provided, to be highest. Using the re-set frequency priority information, the UE performs a cell re-selection procedure to thereby move to a cell in which the MBMS service is provided, and receive the MBMS service.

In a case in which the UE is receiving an MBMS service, in a case in which the UE is interested in receiving an MBMS service, or in a case in which the UE may be able to receive an MBMS service while being camped on in a frequency in which the MBMS service is provided, if a situation in which the re-selected cell broadcasts SIB13 continues, it may be considered that the highest priority has been applied to the corresponding frequency during the MBMS session.

In a case in which fact that one or more MBMS service area identities (SAIs) are included in a user service description (USD) of a corresponding service is indicated by SIB15 of a serving cell.

In a case in which SIB15 is not broadcast within a serving cell and a corresponding frequency is included in a USD of a corresponding service.

Meanwhile, a network may provide additional priority information to control the cell reselection operation of the UE, and the additional priority information is called as 'supreme priority information'.

Supreme priority information may be implemented in various manners. The information may indicate whether the supreme priority information is applied. When the supreme priority information indicates that the supreme priority is applied, the corresponding information may indicate the supreme priority, which is different from a normal reselection priority. For example, the supreme priority may be implemented to be lower than any other normal priority. The information may indicate whether a deprioritisation is applied. That is, the information for deprioritisation may be configured to indicate whether the UE applies the lowest priority to a frequency of the cell that transmits the corresponding information or the lowest priority to all frequencies of the RAT of the cell. When the information indicates that the deprioritisation is applied, the UE may apply the lowest priority to a frequency of the cell which transmitted the information or all frequencies of the RAT of the cell, according to the information.

A network may signal the supreme priority information to a UE. The information may be transmitted in system information that is broadcasted by a cell. The information may be transmitted in a predetermined message from an eNB to the UE, and the predetermined message may be a RRC message. More particularly, the RRC message may be an RRC connection reject message.

The supreme priority information may be applied to the UE in case of a special situation. And, the UE may determine whether the special situation is occurred, by using the event criterion as follows.

If the UE is informed of the overload of current RAT, the UE may consider that the special situation has occurred.

If the UE is informed of the overload of current frequency, the UE may consider that the special situation has occurred.

Meanwhile, the special situation may be indicated to the UE during the RRC connection establishment procedure as follow.

The eNB may include a bit indicating the overload of current RAT in the RRC connection reject message.

The eNB may include a bit indicating the overload of current frequency in the RRC connection reject message.

The eNB may include the supreme priority information in the RRC connection reject message.

When the UE determines that a special situation has occurred, the UE may perform a cell reselection procedure based on the supreme priority information. If the supreme priority information indicates the supreme priority is applied, the UE applies the supreme priority instead of the conventional priorities. If the supreme priority information indicates the deprioritisation is applied, the UE may deprioritise a current frequency of the cell or all frequencies of the current RAT.

The application of the supreme priority information may be available only during predetermined time duration. After the predetermined time, the UE may perform a cell reselection procedure based on normal priorities. For this, the network may further signal timer information related to validity of the supreme priority information to the UE. The timer information may be transmitted in the system information with the supreme priority information. The timer information may be transmitted in the predetermined message with the supreme priority information from an eNB to the UE, and the predetermined message may be a RRC message. More particularly, the RRC message may be the RRC connection reject message. The timer information may indicate a duration time during which the supreme priority/ the supreme priority information can be effectively applied.

On receiving the timer information, the UE may start the timer and apply the supreme priority information. If the UE acquires additional timer information before expiry of the running received timer, the UE may start or restart the timer. The timer is set to a predetermined time value indicated by the additional timer information.

The timer continues to run until the UE enters RRC connected state from RRC idle state. The timer continues to run until the UE reselect a cell of the RAT from which the timer value was received, from a cell of the RAT that is different from the RAT from which the timer value was received.

If the UE has reselected the inter-RAT cell by applying the supreme priority information, the UE does not apply the normal priority information that is received in the reselected RAT cell but keeps applying the supreme priority information until the timer is expired. When the timer is expired, the UE applies the normal priority.

In the similar manner, if the UE has reselected inter-frequency cell by applying the supreme priority information, the UE does not apply normal priority information that is received in cell of the reselected frequency but keeps applying the supreme priority information until the timer is expired. When the timer is expired, the UE applies the normal priority.

Meanwhile, while the timer related to the validity of applying the supreme priority for the predetermined frequency is operating, the UE may provide the MBMS service in which the UE is interested in the predetermined frequency or detect a cell of a predetermined type such as a CGS cell which is proper to the UE. In this case, it may be problematic to choose whether the UE continuously applies the lowest priority to the corresponding frequency depending on the supreme priority while the timer is operating or whether the UE applies the highest priority according to a cell detection of the predetermined type. In this situation, a method may be required that the UE performs a cell reselection by handling the priority.

As such, if there is a collision in applying the priority, the UE may handle the priority application, which will be performed as follows. Hereinafter, applying the highest priority according to the cell detection of the predetermined type is referred to as an implicit priority application.

1. Embodiment of Applying the Implicit Priority Preferentially

If there is a collision between the implicit priority and the supreme priority, a UE may apply the implicit priority preferentially. Performing the cell reselection by applying the highest priority to a considered frequency, the UE may select a cell which is operated on the corresponding frequency as a target cell and move to it.

While the UE acquires the supreme priority information from a network and is operating by applying the lowest priority to the corresponding frequency, the UE may detect a cell of predetermined type. The cell of predetermined type may be a cell that may provide a service in which the UE is interested on the corresponding frequency or provide a better quality of service. For example, the UE may provide the interested MBMS service on the corresponding frequency, detect a cell which is scheduled to provide it, or detect a proper CSG cell of highest ranked which is operated on the corresponding frequency. In this situation, although the timer is continuously operated, which is related to the supreme priority application for the corresponding frequency, the UE may stop applying the lowest priority for the corresponding frequency, and apply the highest priority to the corresponding frequency according to the implicit priority application. Based on the priority handling, the UE may perform the cell reselection, and camp on the selected cell.

As such, if the UE camps on the cell which is operated on the predetermined frequency, the UE always applies the highest priority to the current frequency. That is, in the state of camping on a proper CSG cell or a cell which is operated on the frequency for which interested MBMS service is provided, the UE may be operated by applying the highest priority to the current frequency. In this situation, even though the UE acquires the supreme priority information from a network, the UE may be operated by continuously applying the highest priority according to the implicit priority application to the current frequency.

In the environment that a timer is operated for applying the supreme priority application to the frequency of currently camping on, if a cell which is camped on is not available to provide a service in which the UE is interested or to provide more effective service for the UE, the UE may operate by deprioritising the priority for the current frequency and/or the RAT of current cell according to the supreme priority information. For example, in the situation that the timer for the supreme priority application is operated with respect to the frequency of currently camping on, if the cell that the UE is camping on is no more proper CSG cell, that is, if the corresponding CSG cell becomes a non-member CSG cell or does not become the highest ranked in the current frequency, the UE may stop the implicit highest priority application and may apply the lowest priority to the current frequency or to the RAT of the corresponding cell and operate it. As another example, in a situation that the timer is operated, if no more interested MBMS service is provided in the frequency of cell that the UE is camping on, the UE may stop the implicit highest priority application for the current frequency and may operate it by applying the lowest priority.

2. Embodiment of Applying the Supreme Priority Preferentially

If there is a collision between the implicit priority and the supreme priority, a UE may apply the supreme priority preferentially. Performing the cell reselection by applying the lowest priority to a considered frequency and/or a frequency of the considered RAT, the UE may avoid the operation of selecting the considered frequency and/or the frequency of the considered RAT as a target cell.

While the UE acquires the supreme priority information from a network and is operating by applying the lowest priority to the corresponding frequency and/or the related RAT, the UE may detect a cell of predetermined type. The cell of predetermined type may detect a cell that may provide a service in which the UE is interested on the corresponding predetermined frequency or provide a better quality of service. For example, the UE may provide the interested MBMS service on the corresponding frequency, detect a cell which is scheduled to provide it, or detect a proper CSG cell of highest ranked which is operated on the corresponding frequency. In this situation, if the timer related to the supreme priority application for the corresponding frequency is continuously operated, the UE may not apply the implicit highest priority for the corresponding frequency, and continuously apply the lowest priority to the corresponding frequency and/or the corresponding RAT. Based on the priority handling, the UE may avoid the cell reselection for the predetermined frequency and/or the RAT.

If the timer related to the supreme priority application is expired, the UE may operate following the normal priority signaled from a network or operate by applying the implicit priority according to the cell selection.

As such, if the UE camps on a cell of a predetermined type which is operated on a predetermined frequency, the UE may always apply the highest priority to the current frequency so long as receiving the supreme priority information. That is, the UE is in a state of camping on a proper CSG cell or camping on a cell which is operated on a frequency for which interested MBMS service is provided, the UE always applies the highest priority to the current frequency so long as there is no reception of the supreme priority information. In this situation, if the UE acquires the supreme priority information from a network, the UE may operate by applying the lowest priority for the current frequency and/or the RAT. In this case, the UE may select a cell of the frequency and/or the RAT different from the cell that the UE is camping on as a target cell, and may camp on the selected cell.

Meanwhile, a timer related to the supreme priority application is operated, it may be implemented that the UE does not detect a cell of a predetermined type that provides more effective service for a cell or a UE in which the predetermined service is provided. That is, in a situation that the UE receives the supreme priority information, and according to this, the UE applies the lowest priority for the predetermined frequency and/or the predetermined RAT, the UE may be configured to avoid the operation of detecting the MBMS cell or the proper CSG cell. According to this, the UE may not perform an autonomous search function for detecting the proper CSG cell and/or a series of operations for identifying whether to provide the MBMS service. Through this, the UE may avoid the collision between the implicit priority and the supreme priority beforehand. When the timer related to the supreme priority application is expired, the UE may perform an operation for detecting cell.

Figure 13:
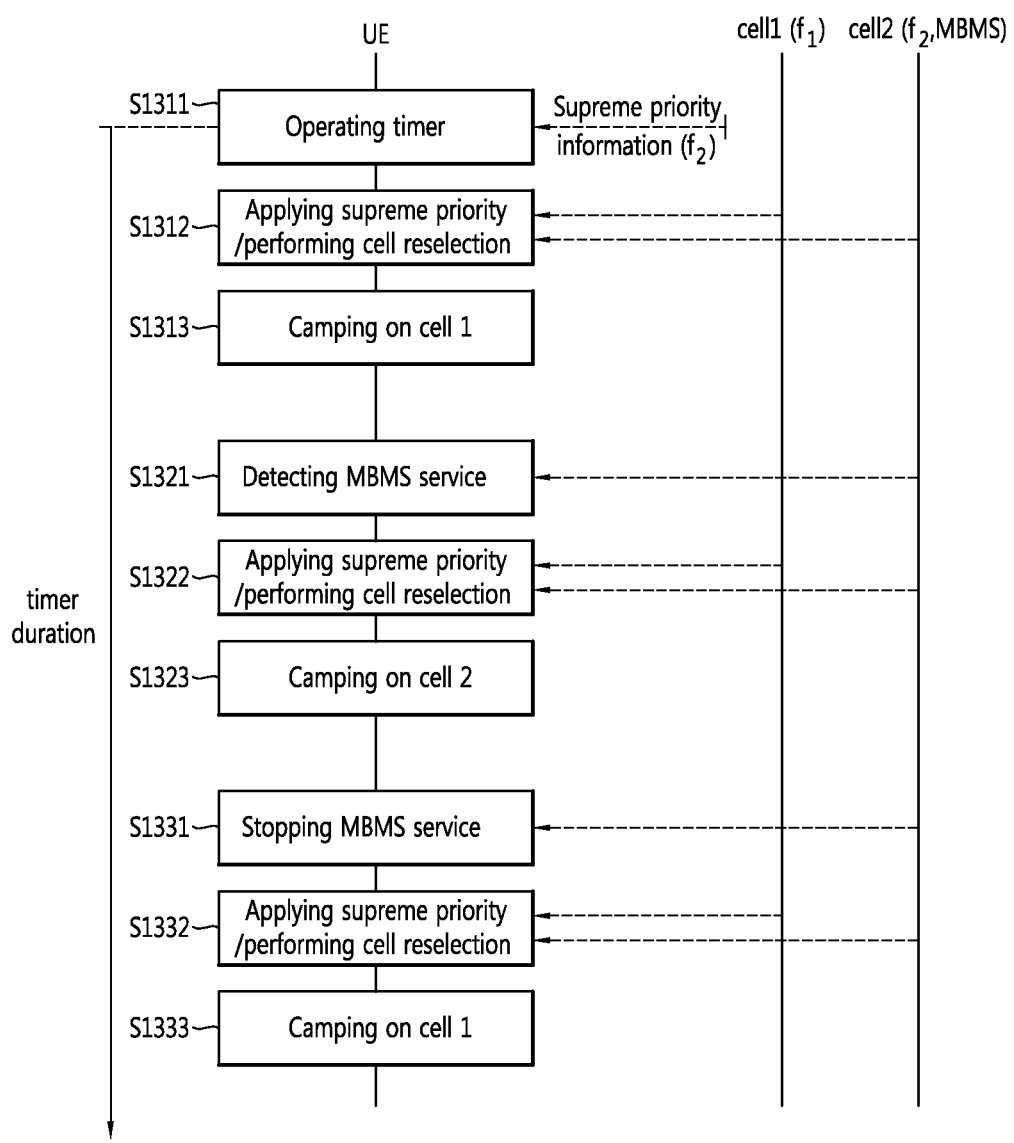
FIG. 13 is a diagram illustrating an example of priority handling-based cell reselection method according to an embodiment of the present invention.

FIG. 13 is a diagram illustrating an example of priority handling-based cell reselection method according to an embodiment of the present invention.

The example illustrated in FIG. 13 is made by assumption that applying implicit priority is ahead of applying supreme priority when a UE operates it. Additionally assuming that cell 1 is a cell which is operated on frequency 1 (f1), and cell 2 is a cell which is operated on frequency 2 (f2) and for which the UE provides the MBMS service.

Referring to FIG. 13, the UE acquires the supreme priority information from a network and operates a timer accordingly (step S1311). The supreme priority information may indicate to apply the supreme priority for the frequency 2 (f2). The supreme priority information may indicate a timer duration value related to the valid duration of the supreme priority application. The supreme priority information may be transmitted with being included in a RRC connection rejection message according to the RRC connection rejection of network.

The UE may perform a cell reselection by applying the supreme priority on the frequency 2 (step, S1312). When performing the inter-frequency cell reselection, the UE may consider that the priority for the frequency 2 is lower than the priority for any other frequencies. Accordingly, the UE may select a target cell from the cell that is being operated on another frequency instead of the frequency 2, and cell 1 which is being operated on frequency 1 (f1) may be decided to be a target cell in this example.

The UE may camp on cell 1 according to the cell reselection result (step, S1313). As a timer is on driving, the UE may operate by constantly applying the lowest priority to the frequency 2.

The UE may sense a cell that provides the interested MBMS service during the timer driving. The UE may confirm that the interested MBMS service is provided from cell 2 through system information that is transmitted from cell 2 (step, S1321).

The UE that is sensed of the MBMS service provision may apply the implicit priority for the frequency 2 that is the operating frequency of cell 2, and perform the cell reselection procedure accordingly (step, S1322). When performing the inter-frequency cell reselection, the UE may consider that the priority for the frequency 2 is higher than the priority for any other frequencies. Accordingly, the UE may select the cell that is being operated on the frequency 2 as a target cell, and cell 2 which is being operated on frequency 2 (f2) may be decided to be a target cell in this example.

The UE may camp on cell 2 according to the cell reselection result (step, S1323). The UE may ignore the supreme priority application regardless of the driving of a timer during the operation according to the implicit priority application by sensing the MBMS service. So long as the provision of the MBMS service in which the UE is interested on the frequency 2 is not ceased, the UE may operate by applying the highest priority to the frequency 2.

The UE may confirm that the interested MBMS service on the frequency 2 of cell 2 is ceased (step, S1331). Accordingly, the UE stops applying the implicit priority and may stop applying the highest priority for the frequency 2.

As the timer driving on, the UE may apply the supreme priority for the frequency 2 and perform the cell reselection procedure accordingly (step, S1332). When performing the inter-frequency cell reselection, the UE may consider that the priority for the frequency 2 is lower than the priority for any other frequencies. Accordingly, the UE may select a target cell from the cell that is being operated on another frequency instead of the frequency 2, and cell 1 which is being operated on frequency 1 may be decided to be a target cell in this example.

The UE may camp on cell 1 according to the cell reselection result (step, S1313). As a timer is on driving, the UE may operate by constantly applying the lowest priority to the frequency 2. If the timer is terminated later, the UE may perform a cell reselection by applying common priority signaled from a network to the frequency 1 and 2.

If a timer is terminated before S1331, the UE, when the MBMS service is stopped, may perform the cell reselection by applying the common priority signaled from a network to the frequency 1 and 2.

Figure 14:
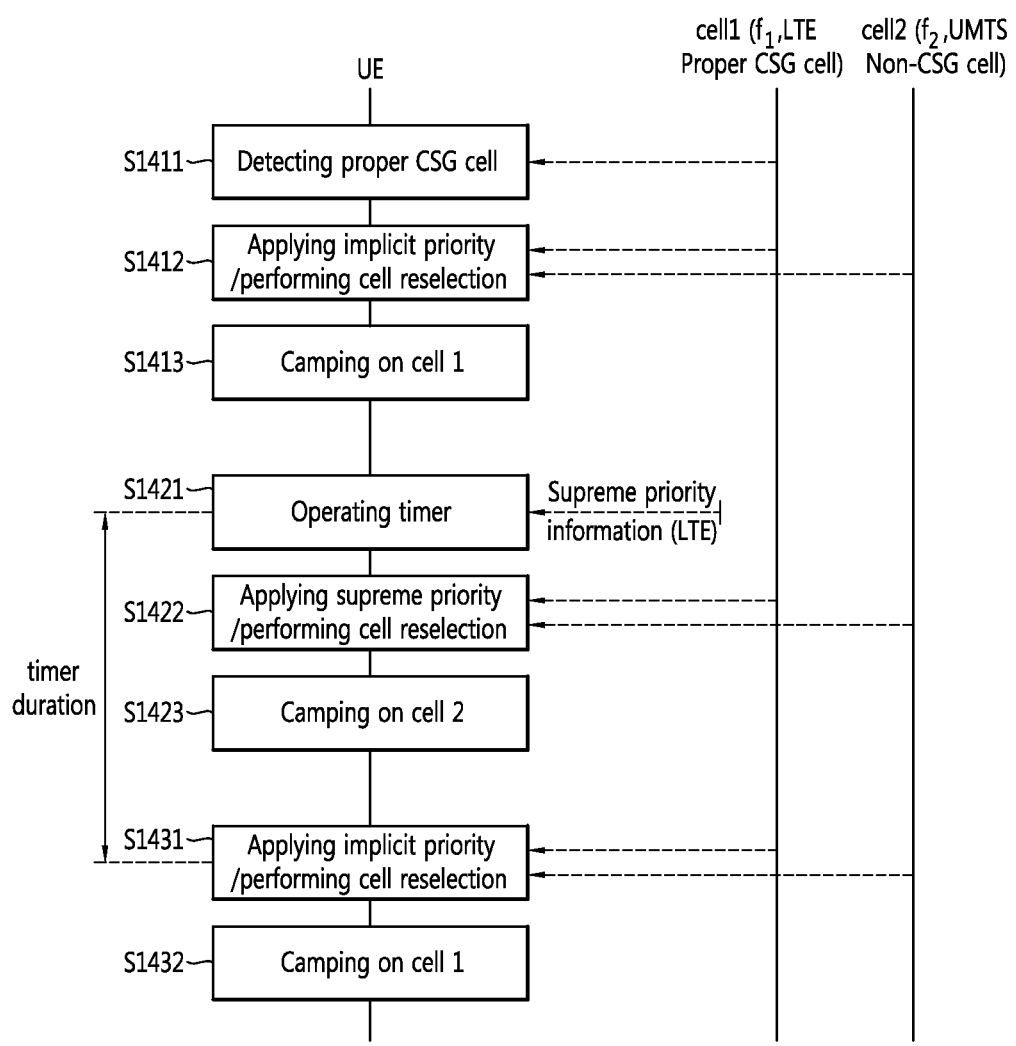
FIG. 14 is a diagram illustrating another example of priority handling-based cell reselection method according to an embodiment of the present invention.

FIG. 14 is a diagram illustrating another example of priority handling-based cell reselection method according to an embodiment of the present invention.

The example illustrated in FIG. 14 is made by assumption that applying supreme priority is ahead of applying implicit priority when a UE operates it. Additionally assuming that cell 1 is a cell based on LTE and a CGS cell proper for the UE, and cell 2 is a cell based on UMTS and a non-CGS cell.

Referring to FIG. 14, the UE detects cell 1 which is a proper CGS cell of highest priority (step, S1411). This may be performed by the autonomous search function and a procedure of measurement and measurement result evaluation of the UE.

According to the cell detection, the UE may perform the cell reselection by applying the implicit priority (step, S1412). When performing the cell reselection, the UE may consider that the priority of the frequency of cell 1 is higher than the priority of any other frequencies. Accordingly, through this, the UE may select the highest ranked cell which is operated on the frequency of cell 1 as a target cell, and in this example, the UE may determine cell 1 to be the target cell.

The UE may camp on cell 1 according to the cell reselection result (step, S1413). If cell 1 corresponds to be a continuously proper CSG cell and also to be the highest priority cell in the corresponding frequency, the UE may operate by continuously applying the highest priority to the frequency of cell 1.

The UE acquires the supreme priority information from a network and operates a timer accordingly (step, S1421). The supreme priority information may indicate to apply the supreme priority for the LTE frequency. The supreme priority information may indicate a timer duration value related to a valid duration of the supreme priority application. The supreme priority information may be transmitted with being included in the RRC connection reject message transmitted when the RRC connection of the network is rejected.

The UE may perform the cell reselection by applying the supreme priority for all frequencies of LTE cell (step, S1422). When performing the cell reselection, the UE may consider that the priority of all frequencies in LTE cell is lower than the priority of frequency of different RAT. Accordingly, the UE may select a cell based on different system, not on LTE, as a target cell. In this example, the UE may determine cell 2 which is operated based on the UMTS to be the target cell.

The UE may camp on cell 2 according to the cell reselection result (step, S1423). The UE may operate by continuously applying the lowest priority for all frequencies since the timer is operating.

If the duration of the timer is expired, which is started upon receiving the supreme priority information, the UE stops the supreme priority application. In case of knowing that cell 1 is still the proper CSG cell, the UE may apply the implicit priority to the frequency of cell 1 if cell 1 is the highest ranked in the corresponding frequency, and may perform the cell reselection based on this (step, S1431). Accordingly, through this, the UE may select the highest ranked CSG cell which is operated on the frequency of cell 1 as the target cell. In this example, the UE may determine cell 1 to be the target cell.

The UE may camp on cell 1 according to the cell reselection result (step, S1432). If cell 1 corresponds to be a continuously proper CSG cell and also to be highest ranked in the corresponding frequency, the UE may operate by continuously applying the highest priority to the frequency of cell 1.

Meanwhile, if cell 1 is no more proper CSG cell for the UE or a proper cell but no more the highest ranked CSG cell when the duration of timer is expired, the UE may perform the cell reselection based on the normal priority signaled from a network. The UE may determine the target cell according to the normal priority and the cell reselection reference, and camp on the selected cell.

Which priority application technique is preferentially applied may be configured by a network when a collision of priority application occurs. The network may select the priority application technique which is to be preferentially applied according to the current network environment (e.g., load of cell, importance of traffic required to be processed, degree of providing service to the UE, etc.), and this may be notified to the UE. In this case, the UE may selectively apply the frequency priority application technique according to the priority technique indicated by the network. The network may transmit the priority application indication to the UE beforehand or transmit it when the occurrence of collision in applying the priority is reported by the UE. The priority application indication from the network may restrict the condition on the environment in which a predetermined priority application is applicable. For example, the network may instruct to preferentially apply the implicit priority, but this may be restricted to apply only to at least one of cell detection providing the MBMS service and CSG cell detection.

Without any separate instruction from the network, the UE may apply by autonomously selecting a predetermined priority application technique, and this may be dependent on an implementation of the UE.

According to a cell reselection method according to an embodiment of the present invention, the UE may select a proper target cell through a priority adjustment. In case that a collision occurs due to both of the lowest priority application and the highest priority application being required, the UE may avoid the collision through applying consistent predetermined priority, and perform the cell reselection based on the priority. The UE may camp on the cell selected through the cell reselection and try to access. The UE may be provided with more improved service or desired service.

Figure 15:
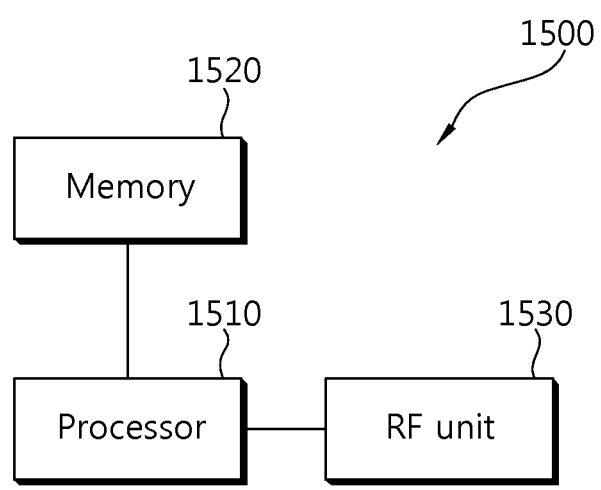
FIG. 15 is a block diagram illustrating the wireless apparatus in which an embodiment of the present invention can be implemented.

FIG. 15 is a block diagram illustrating the wireless apparatus in which an embodiment of the present invention can be implemented. The apparatus may be implemented to a UE and/or a BS that performs the cell reselection method according to the embodiments of the present invention.

The wireless apparatus 1500 includes a processor 1510, a memory 1520 and a RF unit 1530. The processor 1510 implements the proposed functions, processes and/or methods. The processor 1510 may be configured to perform the handling based on the supreme priority and the implicit priority. The processor 1510 may be configured to perform the cell reselection based on the priority handling. The processor 1510 may be configured to implement the aforementioned embodiments with reference to the drawings.

The RF unit 1530 transmits and receives the radio signal with being connection to the processor 1510.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A cell reselection method performed by a user equipment (UE) in a wireless communication system, the method comprising:

receiving, by the UE from a network, information indicating to apply a lowest priority to a current frequency, wherein the information is received through a radio resource control (RRC) connection reject message,
wherein a timer is used to indicate a period for which the current frequency is to be de-prioritised to the lowest priority,
wherein the timer is started upon receiving the RRC connection reject message, and the de-prioritisation of the current frequency is stopped at an expiry of the timer; and
performing, by the UE, a cell reselection with selectively applying the lowest priority to the current frequency or the highest priority to the current frequency,
wherein the lowest priority is applied to the current frequency based on the received information or the highest priority is applied to the current frequency if the UE detects a specific type of cell.

2. The method of claim 1, wherein the specific type of cell is a cell providing a multimedia broadcast multimedia service (MBMS) that the UE is camped on the current frequency.

3. The method of claim 1, wherein the specific type of cell is detected by the UE using system information transmitted from the network.

4. The method of claim 1, wherein the specific type of cell is a member-CGS cell of the UE is camped on the current frequency.

5. A wireless apparatus operated in a wireless communication system, the wireless apparatus comprising:
a radio frequency (RF) unit that transmits and receives a radio signal; and
a processor operating functionally connected with the RF unit,
wherein the processor is configured to perform,
receiving information indicating to apply a lowest priority to a current frequency,
wherein the information is received through a radio resource control (RRC) connection reject message,
wherein a timer is used to indicate a period for which the current frequency is to be de-prioritised to the lowest priority,
wherein the timer is started upon receiving the RRC connection reject message, and the de-prioritisation of the current frequency is stopped at an expiry of the timer; and
performing a cell reselection with selectively applying the lowest priority to the current frequency or the highest priority to the current frequency,
wherein the lowest priority is applied to the current frequency based on the received information or the highest priority is applied to the current frequency if a user equipment (UE) detects a specific type of cell.

6. The wireless apparatus of claim 5, wherein the specific type of cell is a cell providing a multimedia broadcast multimedia service (MBMS) that the UE is camped on the current frequency.

7. The wireless apparatus of claim 5, wherein the specific type of cell is detected by the UE using system information transmitted from the network.

8. The wireless apparatus of claim 5, wherein the specific type of cell is a member-CSG cell of the UE is camped on the current frequency.

* * * * *